(No Model.)
J. V. UPINGTON.
SULKY.
No. 263,254. Patented Aug. 22, 1882.
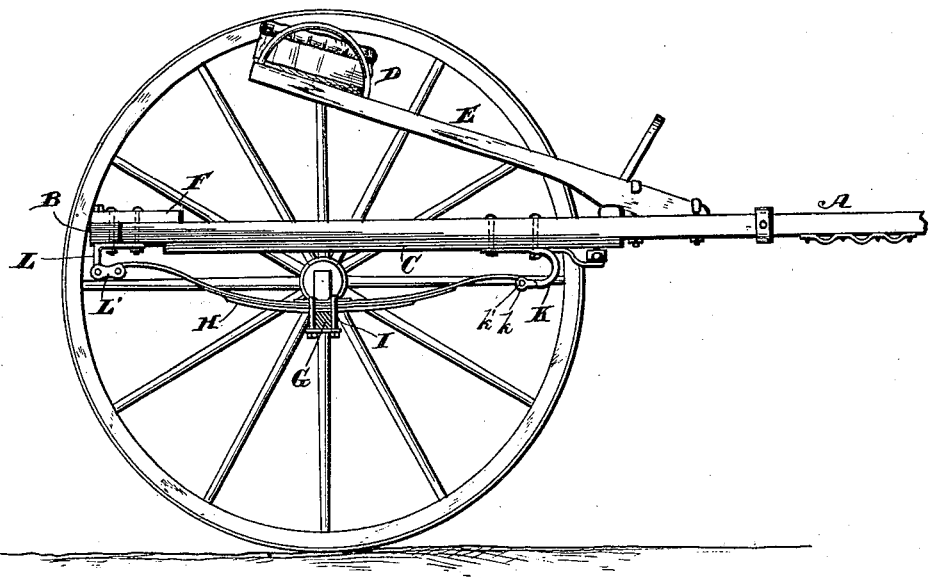
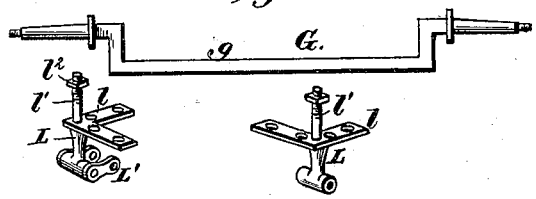
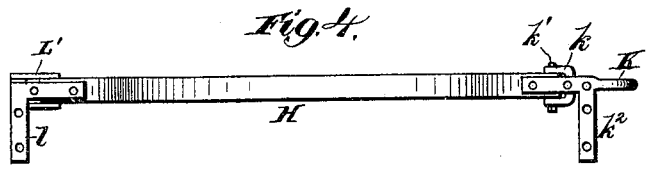
Witnesses.
Robert Everett,
A. H. Norris
Inventor.
John V. Upington
By James L. Norris.
Atty.

UNITED STATES PATENT OFFICE.

JOHN V. UPINGTON, OF LEXINGTON, KENTUCKY, ASSIGNOR OF ONE-HALF TO JAMES T. UPINGTON, OF SAME PLACE.

SULKY.

SPECIFICATION forming part of Letters Patent No. 263,254, dated August 22, 1882.

Application filed July 15, 1882. (No model.)

*To all whom it may concern:*

Be it known that I, JOHN V. UPINGTON, a citizen of the United States, residing at Lexington, in the county of Fayette and State of Kentucky, have invented new and useful Improvements in Breaking Carts or Sulkies, of which the following is a specification.

This invention relates to that class of breaking carts or sulkies for which several Letters Patent have heretofore been granted to me, and of which reference to Patent No. 250,303 is considered sufficient.

The objects of my present improvement are to provide elastic supports for the rear ends of the shafts which form the sides of the body-frame at points in rear of as well as in advance of the axle; also, to provide certain devices both for supporting the ends of the springs from the shafts and for bracing and firmly connecting the shafts and the front and rear cross-bars together; also, to allow the body-frame to be set low down to relieve the spring-supports for the driver's seat from excessive strain and to prevent objectionable jolting.

In the annexed drawings, Figure 1 is a side elevation of my improved breaking cart or sulky with one of the wheels removed. Fig. 2 represents one of the springs with its supports detached. Fig. 3 is a rear view of the axle and rear supports for the spring. Fig. 4 is a top or plan view of one of the springs with its front and rear supports. Fig. 5 illustrates a different form of support for the front end of the spring. Fig. 6 is a partial bottom view.

The shafts A, which extend back of the axle, are connected together, both at their rear ends and at a point in advance of the axle, by means of cross-bars B, thereby forming the body-frame, as in my said patent hereinbefore referred to by number.

The bottom boards, C, are also secured to the under side of said frame, and the driver's seat D is supported upon the inclined spring-bars E, which are secured at their lower ends to the shafts.

I also propose employing the step F, which is secured upon the rear end of the body-frame.

The axle G may be straight or of any of the usual forms; but in the present example it has a crank-shaped or depressed portion, $g$, between the wheels, and the side springs, H, are each secured at their middle to upper or the under side of said depressed part of the axle by means of a suitable clip, I. These springs, which are bow-shaped, can be the ordinary many-leaved metallic spring, or, if preferred, they can be made of some tough elastic wood. In order to connect the ends of these springs with the body-frame, I provide at each of the front corners of the latter a curved pendent bracket, K, having at its lower terminal a clip, $k$, with which the front end of the spring is connected by a bolt, $k'$, passing through the side plates of the clip. This pendent bracket which supports the forward ends of the springs is formed or provided at its upper end with a perforated angle-plate, $k^2$, or two perforated horizontal arms, respectively adapted to fit against the under side of the shaft and the cross-bar at the junction of the two latter. Bolts or screws are passed through the perforations of these arms into the shaft and cross-bar, whereby while the bracket is held by such means in rigid connection with the body-frame the shafts and the front cross-bar are braced and strengthened and held firmly together. In order to connect the rear ends of these springs with the body-frame, I provide at each rear corner of the latter a short pendent bracket or standard, L, having at its lower end a shackle, L', with which the spring is connected by means of one of the shackle-bolts.

Perforated angle-plates $l$ are secured to the under side of the rear ends of the shafts and the ends of the cross-bar B by means of bolts or screws, and the brackets which support the rear ends of the springs are each either cast in one piece with one of said angle-plates or the bracket can be provided with a screw-threaded shank, $l'$, which passes up through the angle-plate and shaft or the shaft and cross-bar, and a nut, $l^2$, fitted upon the upper end of the said shank, so as to be capable of being tightened up against the shaft or the step. These angle-plates when formed integral with the brackets support the latter, and also brace and connect the shafts and cross-bar firmly together.

When the angle-plates are made separate from the brackets they serve as bearings for the upper ends of the brackets and for the shanks of the same, and also brace and connect the shafts and cross-bar together, as before. Under this construction and arrangement of parts the springs will be supported at their ends and connected with the rear portions of the shafts which constitute the sides of the body-frame, so that in case of the horse falling upon the shafts the springs will yield under the weight, and hence the shafts be prevented from breaking.

The body-frame will be braced and strengthened by the angle-plates, which can be either cast integral with the brackets or which can be all made separately therefrom, and the brackets provided with shanks passing through the angle-plates, as described in connection with the devices for supporting the springs at the rear end of the shafts.

The springs supporting the shafts also receive a portion of the weight of the driver, which will be distributed upon said springs and upon the inclined spring-bars employed for supporting the seat, so that the spring-bars will not break under unusual strain. The above arrangement of springs also allows the body-frame to be set low down, and avoids objectionable jolting of the driver.

In place of the perforated arms or angle-plate employed for securing the brackets to the shafts at their junction with the front cross-bar, I can employ a straight perforated bar or plate, M, (shown in Fig. 5,) and form or provide said plate with two pendent clip-plates, $m$, between which the forward end of the spring is held by means of a bolt passing through said pendent plate.

Having thus described my invention, what I claim is—

1. The combination, in a two-wheeled break wagon or sulky, of the shafts extending back of the axle and constituting the sides of the body-frame, with the springs attached at their middle portions to the axle and supporting the shafts at points in front of and in rear of the axle, substantially as described.

2. The combination, in a two-wheeled break wagon or sulky, of the springs attached at their middle to the axle, with devices connected with the ends of said springs and secured both to the shafts and to the two cross-bars at points in front of and in rear of the axle, substantially as described.

3. The combination, in a two-wheeled break wagon or sulky in which the driver's seat is supported upon the shafts by inclined spring-bars, of the shafts extending back of the axle and the springs connected to the axle and supporting the shafts, whereby the weight is partially transferred from the spring-seat bars to the springs supporting the shafts, substantially as described.

4. The combination, with the shafts extending back of the axle, of the brackets K, connected with the springs which are clipped upon the axle, and the perforated angle-plates $k^2$, formed with said brackets and secured both to the shafts and to a cross-bar connecting the shafts together, substantially as described.

5. The combination, with the shafts extending back of the axle, of the brackets L, connecting by shackles with the rear ends of springs which are clipped upon the axle, and the perforated angle-plates secured to the shafts, and a cross-bar connecting the same, said brackets each having a screw-threaded shank which passes up through the angle-plate and shaft, and which has a tightening-nut fitted upon its upper end, substantially as described.

In testimony whereof I have hereunto set my hand in the presence of two subscribing witnesses.

JOHN V. UPINGTON.

Witnesses:
W. C. STANDEFORD,
W. C. SIEHECHT.